US008428934B2

(12) United States Patent
Connor

(10) Patent No.: US 8,428,934 B2
(45) Date of Patent: Apr. 23, 2013

(54) PROSE STYLE MORPHING

(75) Inventor: Robert A. Connor, Minneapolis, MN (US)

(73) Assignee: Holovisions LLC, Forest Lake, MN (US)

( * ) Notice: Subject to any disclaimer, the term of this patent is extended or adjusted under 35 U.S.C. 154(b) by 422 days.

(21) Appl. No.: 12/806,285

(22) Filed: Aug. 9, 2010

(65) Prior Publication Data
US 2011/0184727 A1 Jul. 28, 2011

Related U.S. Application Data

(60) Provisional application No. 61/336,757, filed on Jan. 25, 2010.

(51) Int. Cl.
G06F 17/20 (2006.01)
G06F 17/27 (2006.01)

(52) U.S. Cl.
USPC .................. 704/9; 704/1; 434/167; 715/255

(58) Field of Classification Search .................. 704/1, 9; 434/156, 167; 715/255
See application file for complete search history.

(56) References Cited

U.S. PATENT DOCUMENTS

| 4,456,973 | A | | 6/1984 | Carlgren et al. | |
|---|---|---|---|---|---|
| 4,773,039 | A | * | 9/1988 | Zamora | 715/256 |
| 5,200,893 | A | * | 4/1993 | Ozawa et al. | 715/235 |
| 5,499,366 | A | * | 3/1996 | Rosenberg et al. | 1/1 |
| 5,559,693 | A | * | 9/1996 | Anick et al. | 704/9 |
| 5,903,905 | A | * | 5/1999 | Andersen et al. | 715/275 |
| 6,612,844 | B1 | * | 9/2003 | Vallee | 434/156 |
| 6,782,510 | B1 | * | 8/2004 | Gross et al. | 715/257 |
| 7,113,943 | B2 | | 9/2006 | Bradford et al. | |
| 7,120,613 | B2 | * | 10/2006 | Murata | 706/12 |
| 7,313,513 | B2 | * | 12/2007 | Kinder | 704/1 |
| 7,472,343 | B2 | | 12/2008 | Vasey | |
| 7,555,713 | B2 | * | 6/2009 | Yang | 715/248 |
| 7,599,899 | B2 | | 10/2009 | Rehberg et al. | |
| 7,603,268 | B2 | * | 10/2009 | Volcani et al. | 704/10 |
| 7,627,562 | B2 | | 12/2009 | Kacmarcik et al. | |
| 7,640,158 | B2 | | 12/2009 | Detlef et al. | |
| 7,735,026 | B2 | * | 6/2010 | Kurzweil et al. | 715/867 |
| 7,752,034 | B2 | * | 7/2010 | Brockett et al. | 704/9 |
| 7,788,085 | B2 | * | 8/2010 | Brun et al. | 704/9 |
| 7,970,616 | B2 | * | 6/2011 | Dapkunas | 704/270 |
| 8,019,595 | B1 | * | 9/2011 | Kinder | 704/9 |
| 8,036,899 | B2 | * | 10/2011 | Sobol-Shikler | 704/270 |
| 2004/0267633 | A1 | * | 12/2004 | Tanaka et al. | 705/26 |
| 2005/0034071 | A1 | * | 2/2005 | Musgrove et al. | 715/530 |

(Continued)

FOREIGN PATENT DOCUMENTS
WO    WO 8808160 A1 * 10/1988

*Primary Examiner* — James Wozniak

(57) ABSTRACT

This invention is a method for incrementally and multi-dimensionally adjusting prose style in the following steps: creating a database of sets of phrase synonyms; assigning rankings and/or values to phrases in the database for each phrase's ranking and/or value with respect to a selected dimension of prose style, for at least two different dimensions of prose style; receiving input prose from a user; receiving a style adjustment preference from a user for at least one dimension of prose style through a multi-dimensional style-adjusting interface; and making adjustments to the style of the input prose using the database of phrase synonyms and phrase rankings and/or values in order to achieve the style adjustment preference specified by the user.

16 Claims, 5 Drawing Sheets

U.S. PATENT DOCUMENTS

| | | | |
|---|---|---|---|
| 2005/0154580 A1* | 7/2005 | Horowitz et al. | 704/9 |
| 2006/0190804 A1* | 8/2006 | Yang | 715/500 |
| 2007/0100823 A1 | 5/2007 | Inmon | |
| 2007/0166684 A1* | 7/2007 | Walker | 434/322 |
| 2007/0294077 A1* | 12/2007 | Narayanan et al. | 704/2 |
| 2009/0030669 A1* | 1/2009 | Dapkunas | 704/1 |
| 2009/0094137 A1 | 4/2009 | Toppenberg et al. | |
| 2009/0217159 A1 | 8/2009 | Dexter et al. | |
| 2009/0248399 A1* | 10/2009 | Au | 704/9 |
| 2009/0306962 A1* | 12/2009 | Harlow et al. | 704/9 |
| 2009/0313233 A1 | 12/2009 | Hanazawa | |
| 2010/0251094 A1* | 9/2010 | Holm et al. | 715/230 |
| 2010/0318903 A1* | 12/2010 | Ferren | 715/259 |
| 2010/0324894 A1* | 12/2010 | Potkonjak | 704/235 |
| 2011/0087961 A1* | 4/2011 | Fitusi et al. | 715/261 |
| 2011/0184725 A1* | 7/2011 | Connor | 704/9 |
| 2011/0184727 A1* | 7/2011 | Connor | 704/9 |

* cited by examiner

PROSE STYLE MORPHING

CROSS-REFERENCE TO RELATED APPLICATIONS

This patent application claims the priority benefit of: U.S. Provisional Patent Application Ser. No. 61/336,757, entitled "Morphing Text Style," filed on Jan. 25, 2010 by Robert A. Connor; and U.S. patent application Ser. No. 12,803,161, entitled "Text Sizer (TM)," filed on Jun. 21, 2010 by Robert A. Connor.

FEDERALLY SPONSORED RESEARCH

Not Applicable

SEQUENCE LISTING OR PROGRAM

Not Applicable

BACKGROUND

1. Field of Invention

This invention relates to word-processing methods.

2. Introduction and Review of the Prior Art

A tool that enables users to automatically, incrementally, and multi-dimensionally adjust multiple dimensions of prose style would be very useful for a wide variety of applications. Key dimensions of prose style may include the following: person perspective (e.g. use of third person); tense (e.g. use of future tense); voice (e.g. use of active voice); length (e.g. larger number of characters); vocabulary (e.g. college level vocabulary); formality (e.g. more formal words and sentence structure); colloquiality (e.g. greater use of colloquial expressions and slang); complexity (e.g. more complex wording and sentence structure); emotion (e.g. more emotive words); emoticons (e.g. greater use of emoticons in prose); color (e.g. varying word/phrase color to reflect word/phrase meaning); font (e.g. varying word/phrase font to reflect word/phrase meaning); romantic (more romantic style); positivity (e.g. more positive tone); strength (e.g. stronger language); precision (e.g. more precise wording); certainty (e.g. more certain wording); alliteration (e.g. more words with same first letter); humor (e.g. greater use of humorous expressions and comments); nationality (e.g. British English spellings and expressions); regionality (e.g. more use of Southern expressions); gender specificity (e.g. gender neutral wording); obscenity filter (e.g. alternative phrases for obscene phrases); academic jargon (e.g. more academic jargon); business jargon (e.g. more business jargon); legal jargon (e.g. more legal jargon); medical jargon (e.g. more medical jargon); scientific jargon (e.g. more scientific jargon); and connectivity jargon (e.g. more internet-style words and abbreviations).

There is some prior art for automatically changing the style of prose-based content. However, this prior art appears to be relatively limited, especially compared to the tools that are available for changing key dimensions of other types of content, such as image-based content and sound-based content. For example, there are tools in the prior art, including Adobe Photoshop®, that enable a user to incrementally and multi-dimensionally adjust key dimensions (such as color saturation, color hue, contrast, and various photographic filters) of image-based content such as photographs. There are also tools in the prior art, including Pro Tools®, that enable a user to incrementally and multi-dimensionally adjust key dimensions (such as frequency-range-specific volume and special audio effects such as reverb) of audio content such as music.

However, there is much less progress in the prior art when it comes to tools to modify the style of prose-based content. Specifically, there does not appear to be any comparable tool in the prior art (in the field of word processing, for example) that enables a user to incrementally and multi-dimensionally adjust key dimensions of prose style. This is the gap that is filled by the invention disclosed herein. We now review the most relevant prior art in the field of prose processing.

There is prior art that appears to disclose methods for changing the style of one document to match the style of one (or more) other documents. For example, U.S. Pat. No. 7,472,343 (Vasey, 2008, "Systems, Methods and Computer Programs for Analysis, Clarification, Reporting on and Generation of Master Documents for Use in Automated Document Generation") appears to disclose a method to change the style of one document to match the style of a master document. Similarly, U.S. Pat. No. 7,627,562 (Kacmarcik et al., 2009, "Obfuscating Document Stylometry") appears to disclose a method to change the style of one document to match the style of one or more other documents. Also, U.S. Pat. No. 7,599,899 (Rehberg et al., 2009, "Report Construction Method Applying Writing Style and Prose Style to Information of User Interest") appears to disclose a method to change the style of one document to match the style of prior documents written by a single person.

There is also prior art that appears to disclose binary methods to substitute words or phrases to change a single dimension of prose style. For example, U.S. Pat. No. 4,456,973 (Carlgren et al, 1984, "Automatic Text Grade Level Analyzer for a Text Processing System") appears to disclose a method to substitute words in a body of prose to match the vocabulary of a certain grade level. U.S. Pat. No. 4,773,039 (Zamora, 1988, "Information Processing System for Compaction and Replacement of Phrases") appears to disclose a method to replace "trite" phrases in a body of prose and U.S. Pat. No. 7,113,943 (Bradford et al., 2006, "Method for Document Comparison and Selection") appears to disclose a method to replace idioms in a body of prose. U.S. patent application 20070100823 (Inmon, 2007, "Techniques for Manipulating Unstructured Data using Synonyms and Alternate Spellings Prior to Recasting as Structured Data") appears to disclose a method to substitute phrases in documents to make them more search-engine friendly.

Although prior art in this field has some useful applications, it tends to be binary (all or nothing) and unidimensional (changing only one dimension of prose style). None of the prior art appears to enable a user to incrementally and multi-dimensionally adjust the style of prose-based content in a manner analogous to the way in which Adobe Photoshop® enables adjustment of image-based content or Pro Tools® enables adjustment of sound-based content. The invention disclosed herein fills this gap in the field of word processing methods for prose-based content. It is a system and method for incremental, multi-dimensional adjustment of prose style.

SUMMARY AND ADVANTAGES OF THIS INVENTION

This invention is a system and method for incrementally and multi-dimensionally adjusting prose style. It comprises: a prose input interface, through which the user inputs or otherwise selects prose; a multi-dimensional style-adjusting interface, through which the user incrementally adjusts multiple dimensions of prose style; and a style-morphing engine which executes the adjustments specified by the user through the multi-dimensional style-adjusting interface. In an example, the style-morphing engine may include a database of sets of phrase synonyms and may use this database to make phrase substitutions that incrementally and multi-dimensionally change the style of the prose. In another example, the style-morphing engine may include a semantic algorithm or Natural Language Processor (NLP) that identifies phrases with similar meanings but different values across different style dimensions and makes phrase substitutions that incrementally and multi-dimensionally change the style of the prose.

The dimensions of prose style to be adjusted may be selected from the group consisting of: person perspective (e.g. use of third person); tense (e.g. use of future tense); voice (e.g. use of active voice); length (e.g. larger number of characters); vocabulary (e.g. college level vocabulary); formality (e.g. more formal words and sentence structure); colloquiality (e.g. greater use of colloquial expressions and slang); complexity (e.g. more complex wording and sentence structure); emotion (e.g. more emotive words); emoticons (e.g. greater use of emoticons in prose); color (e.g. varying word/phrase color to reflect word/phrase meaning); font (e.g. varying word/phrase font to reflect word/phrase meaning); romantic (more romantic style); positivity (e.g. more positive tone); strength (e.g. stronger language); precision (e.g. more precise wording); certainty (e.g. more certain wording); alliteration (e.g. more words with same first letter); humor (e.g. greater use of humorous expressions and comments); nationality (e.g. British English spellings and expressions); regionality (e.g. more use of Southern expressions); gender specificity (e.g. gender neutral wording); obscenity filter (e.g. alternative phrases for obscene phrases); academic jargon (e.g. more academic jargon); business jargon (e.g. more business jargon); legal jargon (e.g. more legal jargon); medical jargon (e.g. more medical jargon); scientific jargon (e.g. more scientific jargon); and connectivity jargon (e.g. more internet-style words and abbreviations).

The ability to incrementally change multiple dimensions of prose style is a powerful advantage over methods in the prior art that offer only binary and/or single-dimension style-adjustment. The significance of this advantage may be better understood by considering analogies of this invention to incremental, multi-dimensional tools for adjusting image-based content (such as photos) and sound-based content (such as music). For example, image processing software that allows one to convert a color image into a black-and-white image in a binary manner has some value, but image processing software, such as Adobe Photoshop®, that allows one to incrementally adjust multiple image attributes (hue, saturation, contrast, etc.) is much more powerful and useful. As another example, audio processing software that allows one to switch audio content from low volume to high volume in a binary manner has some value, but audio processing software, such as Pro Tools®, that allows one to independently adjust the levels of sound energy in different frequency ranges (or to add special sound effects such as reverb) is much more powerful and useful. In like manner, the incremental multi-dimensional style-adjusting interface that is central to this invention is much more powerful and useful in the field of text-processing than any method that merely adjusts style in a single dimension in a binary manner. There does not appear to be any such tool in the prior art for incremental and multi-dimensional adjustment of prose style. This is the gap that is filled by this invention.

INTRODUCTION TO THE FIGURES

FIGS. 1 through 5 show a five-step sequence of how a user can use this invention to make incremental and multi-dimensional style adjustments in a small portion of prose.

FIG. 1 shows the first step in this sequence, wherein the user enters the prose, but has not yet made style adjustments.

FIG. 2 shows the next step in this sequence, wherein the user employs this invention to make the prose shorter.

FIG. 3 shows another step, wherein the user employs this invention to also make the prose less formal.

FIG. 4 shows another step, wherein the user employs this invention to also make the prose less positive in tone.

FIG. 5 shows another step, wherein the user employs this invention to also increase net-style ("electronic connectivity") jargon in the prose.

DETAILED DESCRIPTION OF THE FIGURES

FIGS. 1 through 5 show one way in which this invention may be embodied. They do not limit the full generalizability of the claims. FIGS. 1 through 5 show a sequence of variation in multiple dimensions of style for a small portion of prose, wherein this variation is accomplished using one potential embodiment of this system and method for incrementally and multi-dimensionally adjusting prose style. In this five-figure sequence, a user incrementally adjusts the style of this small portion of prose along four style dimensions: length (from longer to shorter), formality (form more formal to more informal), positivity (from more positive to more negative), and net jargon (from less net jargon to more net jargon). The user makes these incremental style adjustments using a multi-dimensional style-adjusting interface. We now discuss these five figures in detail.

Figure 1:
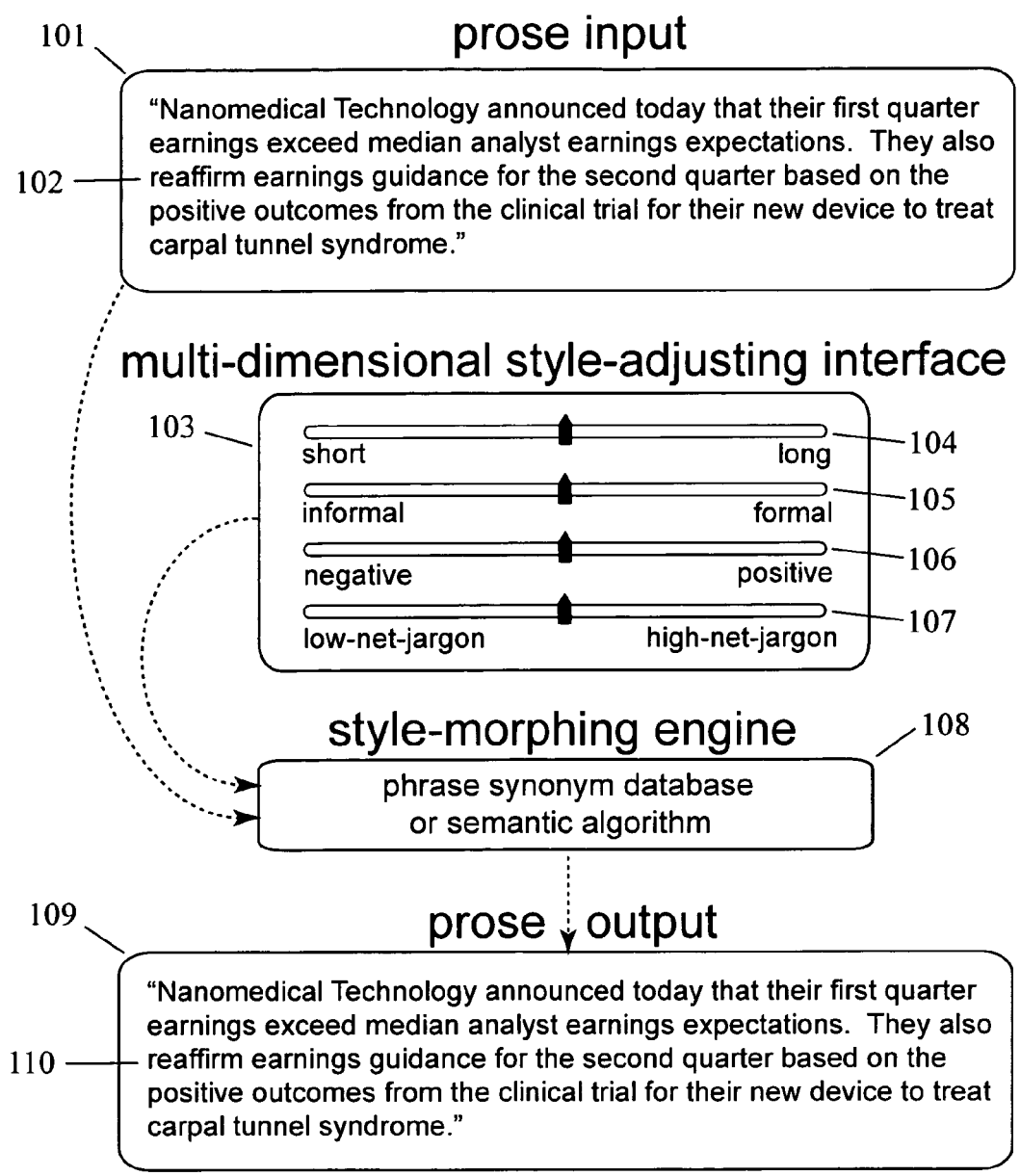
FIGS. 1 through 5 show one embodiment of this invention, but do not limit the full generalizability of the claims.

FIG. 1 shows the first step in this sequence of style variation. In this first step, the user enters the prose that will be processed, but has not yet made any adjustments to style. FIG. 1 has three main components. The first main component is a prose input interface 101, located at the top of the figure, through which the user enters or otherwise selects the prose. The second main component is a multi-dimensional style-adjusting interface 103, located in the upper middle portion of the figure, through which the user incrementally adjusts multiple dimensions of prose style. The third main component is a style-morphing engine 108, in the lower middle portion of the figure, which makes the style adjustments to the prose in accordance with the user preferences expressed by manipulation of the controls in the multi-dimensional style-adjusting interface. The embodiment shown in FIG. 1 also includes a prose output interface 109. The prose output interface shows the final prose output, including any style adjustments made by the system. In FIG. 1, all of the controls in the multi-dimensional style-adjusting interface remain in neutral (middle) positions, so there are no adjustments to prose style. For this reason, prose output 110 is the same as prose input 102 in FIG. 1.

We now trace the processing of the prose in FIG. 1 in more detail. We start with the prose input interface 101 at the top of the figure. In this example, the user has typed a small portion of prose, 102, into window 101. In this example, window 101 is the prose input interface. In this example, prose input 102 is a brief (hypothetical) business news item, as follows:

"Nanomedical Technology announced today that their first quarter earnings exceed median analyst earnings expectations. They also reaffirm earnings guidance for the second quarter based on the positive outcomes from the clinical trial for their new device to treat carpal tunnel syndrome."

In this example, the user has entered the prose input directly by typing. In other examples, a user may enter prose by one or more methods selected from the group consisting of: direct entry of prose by means of a physical or virtual keyboard, keypad, touchpad, or touchscreen; importing prose from a file, document, website, or other source; highlighting or otherwise identifying a portion of prose using a cursor; voice, speech, or gesture recognition; and selection of a file, document, website, or other source in response to a search request.

In this example, the controls in the multi-dimensional style-adjusting interface 103 allow the user to incrementally and multi-dimensionally adjust the style of the prose input along four dimensions. In this example, these four dimensions are length, formality, positivity, and net jargon. In this example, the controls of multi-dimensional style-adjusting interface 103 are in the form of four slider bars, 104-107, one slider bar for each of the four dimensions of style. These slider bars 104-107 allow incremental and multi-dimensional independent adjustment of each dimension of prose style. The slider bar for length, 104, allows incremental adjustment of prose length between "short" and "long." The slider bar for formality, 105, allows incremental adjustment of prose formality between "informal" and "formal." The slider bar for positivity 106 allows incremental adjustment of prose positivity between "negative" and "positive." The slider bar for net jargon 107 allows incremental adjustment of prose net jargon content between "low-net-jargon" and "high-net-jargon." In this example, the multi-dimensional style-adjusting interface includes four dimensions of prose style. In other examples, there may be fewer than four dimensions of style or more than four dimensions of style.

In this example, the dimensions of prose style in the multi-dimensional style-adjusting interface are length, formality, positivity, and net jargon. In other examples, dimensions of prose style may be selected from the group consisting of: person perspective (e.g. use of third person); tense (e.g. use of future tense); voice (e.g. use of active voice); length (e.g. larger number of characters); vocabulary (e.g. college level vocabulary); formality (e.g. more formal words and sentence structure); colloquiality (e.g. greater use of colloquial expressions and slang); complexity (e.g. more complex wording and sentence structure); emotion (e.g. more emotive words); emoticons (e.g. greater use of emoticons in prose); color (e.g. varying word/phrase color to reflect word/phrase meaning); font (e.g. varying word/phrase font to reflect word/phrase meaning); romantic (more romantic style); positivity (e.g. more positive tone); strength (e.g. stronger language); precision (e.g. more precise wording); certainty (e.g. more certain wording); alliteration (e.g. more words with same first letter); humor (e.g. greater use of humorous expressions and comments); nationality (e.g. British English spellings and expressions); regionality (e.g. more use of Southern expressions); gender specificity (e.g. gender neutral wording); obscenity filter (e.g. alternative phrases for obscene phrases); academic jargon (e.g. more academic jargon); business jargon (e.g. more business jargon); legal jargon (e.g. more legal jargon); medical jargon (e.g. more medical jargon); scientific jargon (e.g. more scientific jargon); and connectivity jargon (e.g. more internet-style words and abbreviations).

In this example, the controls of the multi-dimensional style-adjusting interface are slider bars. In other examples, the controls of the multi-dimensional style-adjusting interface may be selected from one or more of the control elements in the group consisting of: virtual or physical slider bar; virtual or physical buttons, keyboard, keypad, or touchscreen; virtual or physical dials or knobs; popup menu, drop down menu, or other virtual menu; data entry box, line, or space; mouse and/or cursor movement; voice or speech recognition; and gesture or posture recognition.

FIG. 1 also shows style-morphing engine 108. The style-morphing engine 108 makes incremental, multi-dimensional style adjustments to the prose in order to achieve the style preferences specified by the user through manipulation of the controls in the multi-dimensional style-adjusting interface. In this example, the style-morphing engine includes a database of sets of phrase synonyms. A phrase is defined herein as a character string including one or more words, numbers, abbreviations or combinations thereof. A set of phrase synonyms is defined herein as a set of phrases in which there is at least one phrase in the set for which all other phrases in the set can be substituted in prose usage without causing significant changes in the meaning of the prose or grammatical errors in the prose. In this example, phrases in each set of phrase synonyms have similar meanings, but have different values along different style dimensions. For example, for the dimension of "length" the value for a given phrase can be the number of characters in the phrase. As another example, for the dimension of "formality," a formality ranking could be assigned to each phrase in the database based on subjective assessment or semantic algorithm.

In this example, the style-morphing engine 108 searches for phrases in the original prose 102 that are in the database of phrase synonyms and then replaces them with phrase synonyms with different values in the appropriate style dimensions, according to user preferences as indicated via the multi-dimensional style-adjusting interface. For example, if the user indicates that the prose should be shorter by moving the pointer on the "length" slider bar towards "short", then the style-morphing engine will replace phrases in the original prose with phrase synonyms from the database that are shorter. As another example, if the user indicates that the prose should be less formal by moving the pointer on the "formality" slider bar towards "informal," then the style-morphing engine will replace phrases in the original prose with phrase synonyms from the data base that have a lower formality rating.

In this example, the style-morphing engine 108 uses a database of sets of phrase synonyms to make substitutions in the original prose 102 in order to implement the incremental, multi-dimensional adjusts to prose style that are requested by the user. In another example, the style-morphing engine may use a semantic algorithm or a Natural Language Processor (NLP) to perform this function. For example, instead of using a database with pre-identified alternative phrases, a semantic algorithm or Natural Language Processor may interpret the underlying meaning of a phrase in the original prose 102 and create one or more alternative phrase synonyms in real time. It may then select the best phrase among these alternatives for substitution into the original prose. This is another way to adjust the style of the prose in accordance with user preference expressed through the multi-dimensional style-adjusting interface.

FIG. 1 also shows prose output interface 109. In this example, prose output interface 109 is a window in which prose appears. In this example this window displays prose output 110. Since this example does not include any styles adjustments (all of the slider bar controls 104-107 have neutral settings), prose output 110 in this example is the same as the prose input 102. This will change in FIGS. 2 through 5, but it is useful to show the "no adjustment" case as a baseline before showing variations in subsequent figures.

Figure 2:
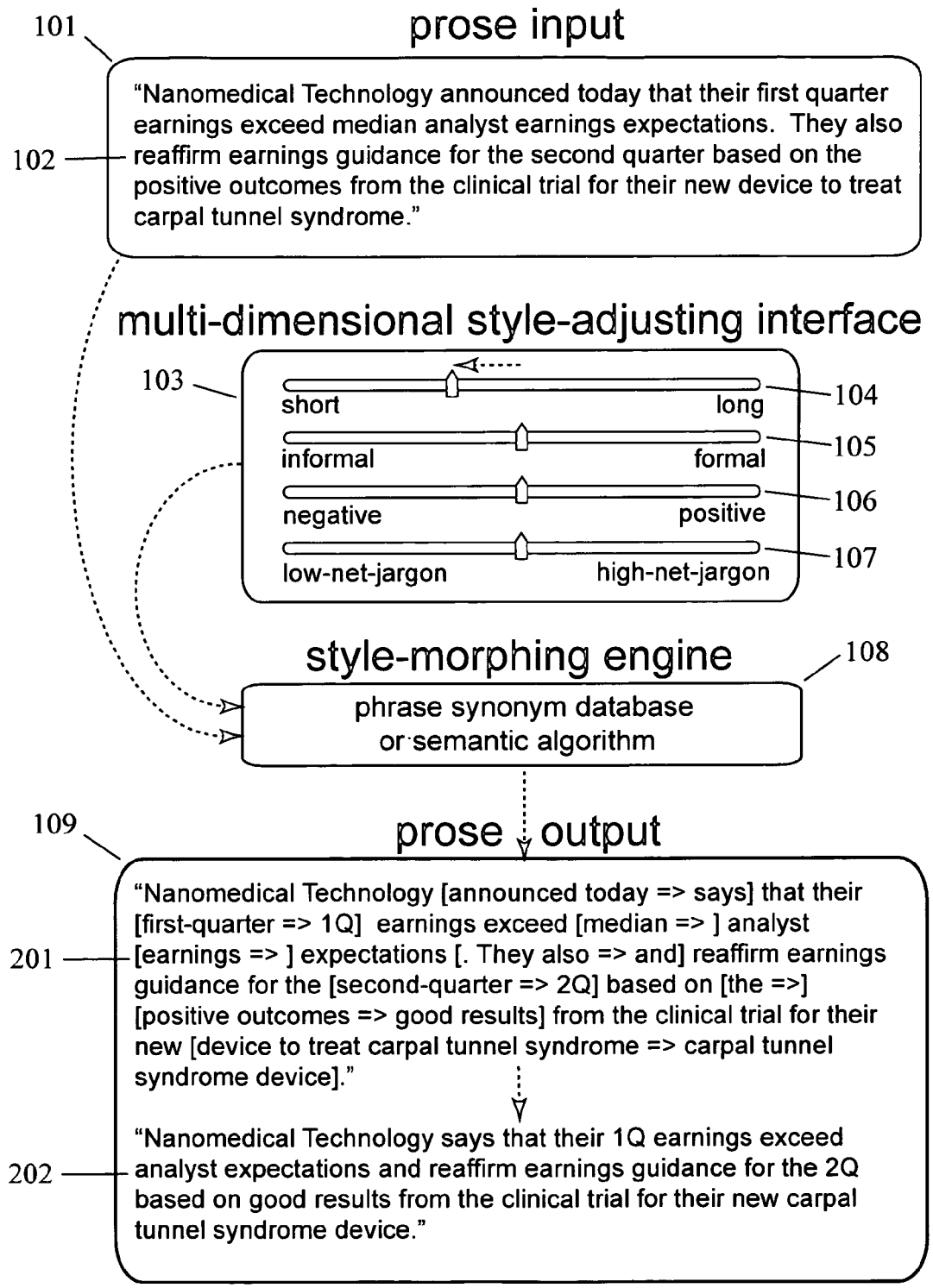

FIG. 2 shows the next step in this sequence of style variations. In this step, the user has incrementally adjusted the style of the prose in at least one dimension. In this example, the user has used this invention to make the prose shorter. As can be seen in FIG. 2, the user has incrementally adjusted the desired style of the prose along the dimension of length by adjusting the controls in the multi-dimensional style-adjusting interface 103. In particular, the user has moved the pointer on the length-dimension slider bar 104 in interface 103 to the left of center, towards the end of the slider bar that is labeled "short."

It is important to note that the user has moved the pointer partly in the direction of the "short" end of the slider bar, but not all the way to the "short" end. This highlights the user's incremental control over the degree to which the invention should shorten the prose. In an example, the user may move the slider bar back and forth, in an interactive manner, to find the optimal trade-off between brevity and loss of detail/content. The ability to incrementally and automatically shorten prose can be extremely useful for any application in which space is constrained. Space-constrained applications include: page-limited reports and forms; report abstracts and executive summaries; advertising; and even Twitter® tweets.

In FIG. 2, as a result of the user having moved the length-dimension slider bar towards "short," the style-morphing engine 108 searches through prose 102 to identify phrases for which there are phrase synonyms with similar meanings, but shorter lengths, in the database. When the engine finds a phrase in the prose for which there is a synonymous and shorter phrase in its database, it replaces the phrase in the original prose with the shorter phrase. The multi-dimensional style-adjusting interface allows incremental variation in style along each dimension.

In this example, the pointer in length-dimension slider bar 104 has been moved to the left of center, but not all the way to the left end of the slider bar. Accordingly, the style-morphing engine shortens the prose, but not to the full amount possible. This is part of the incremental nature of the style-adjusting interface. One way for the style-morphing engine to achieve such incremental style adjustment is to make a percentage (less than 100%) of the potential substitutions. For example, there may be 18 possible phrase substitutions of phrases with similar meaning, but shorter length, for a given portion of prose. However, in an example, since the slider bar is only partially moved to the left of center, perhaps the style-morphing engine might only make 50% (9 out of 18) of the total possible phrase substitutions. Another way for the style-morphing engine to achieve such incremental style adjustments is to make all of the possible substitutions, but to select alternative phrases with mid-range, rather than extreme, values. For example, in the case of making prose shorter, there may be alternative phrase synonyms within a given set in the database with lengths ranging from 10-40 characters that may be substituted for a phrase in the original prose with a length of 30 characters. Since the slider bar is only partially moved to the left of center, the style-morphing engine might select an alternative phrase synonym with 20 characters, less than the original phrase but not the shortest possible alternative phrase.

The ability of this invention to incrementally change multiple dimensions of prose style is a powerful advantage over methods in the prior art that offer only binary (off/on) style-adjustment. The significance of this advantage may be better understood by considering analogies of this invention to incremental, multi-dimensional tools for adjusting visual content (such as photos) and audio content (such as music). For example, image processing software that allows one to convert a color image into a black-and-white image in a binary (off/on) manner has some value, but image processing software that allows one to incrementally adjust multiple image attributes (hue, saturation, contrast, etc.) is much more powerful and useful. As another example, audio processing software that allows one to switch audio content from low volume to high volume in a binary (off/on) manner has some value, but audio processing software that allows one to independently adjust the levels of sound energy in different frequency ranges (or to add special sound effects such as reverb) is much more powerful and useful. In like manner, the incremental multi-dimensional style-adjusting interface that is central to this invention is much more powerful and useful in the field of text-processing than any method than merely adjusts style in a single dimension in a binary (off/on) manner. It also appears to be novel. There does not appear to be any such tool for incremental and multi-dimensional adjustment of prose style in the prior art.

Unlike the case in FIG. 1, in FIG. 2 the prose displayed in prose output interface 109 is different than the original prose input 101. This is because the user has adjusted slider bar 104 toward "short" and the style-morphing engine 108 has shortened the prose accordingly. In this example, prose output interface 109 shows two portions of prose. The first portion of prose, 201, provides the user with detailed information on how phrase substitutions were made by the style-morphing engine. In this example, prose 201 is as follows:

"Nanomedical Technology [announced today=>says] that their [first-quarter=>1Q] earnings exceed [median=>] analyst [earnings=>] expectations [. They also=>and] reaffirm earnings guidance for the [second-quarter=>2Q] based on [the=>] [positive outcomes=>good results] from the clinical trial for their new [device to treat carpal tunnel syndrome=>carpal tunnel syndrome device]."

In this first portion, phrase substitutions made by the style-morphing engine are shown within brackets "[ . . . ]". For example, the bracketed character string "[announced today=>says]" means that the style-morphing engine is replacing the phrase "announced today" in the original prose 101 with the synonymous, but shorter, phrase "says." As another example, the bracketed character sequence "[first quarter=>1Q"] means that the style-morphing engine is replacing the phrase "first quarter" in the original prose 101 with the synonymous; but shorter, phrase "1Q." In another example, prose 201 need not be displayed. In another example, the display of prose 201 could be optional, depending on whether the user would like to see detailed information on what substitutions are made or not.

In this example, the second portion of prose 202 shown in the output interface is the final prose output. The final prose output includes all of the phrase substitutions made in the original prose 102 by the style-morphing engine 108 in accordance with the settings of the multi-dimensional style-adjusting interface 103. In accordance with the user's command, prose output 202 is shorter than prose input 102, but is not the shortest length possible. This intermediate level of shortening reflects the intermediate position of the pointer on slider bar 104. In this example, prose 202 is as follows:

"Nanomedical Technology says that their 1Q earnings exceed analyst expectations and reaffirm earnings guidance for the 2Q based on good results from the clinical trial for their new carpal tunnel syndrome device."

Figure 3:
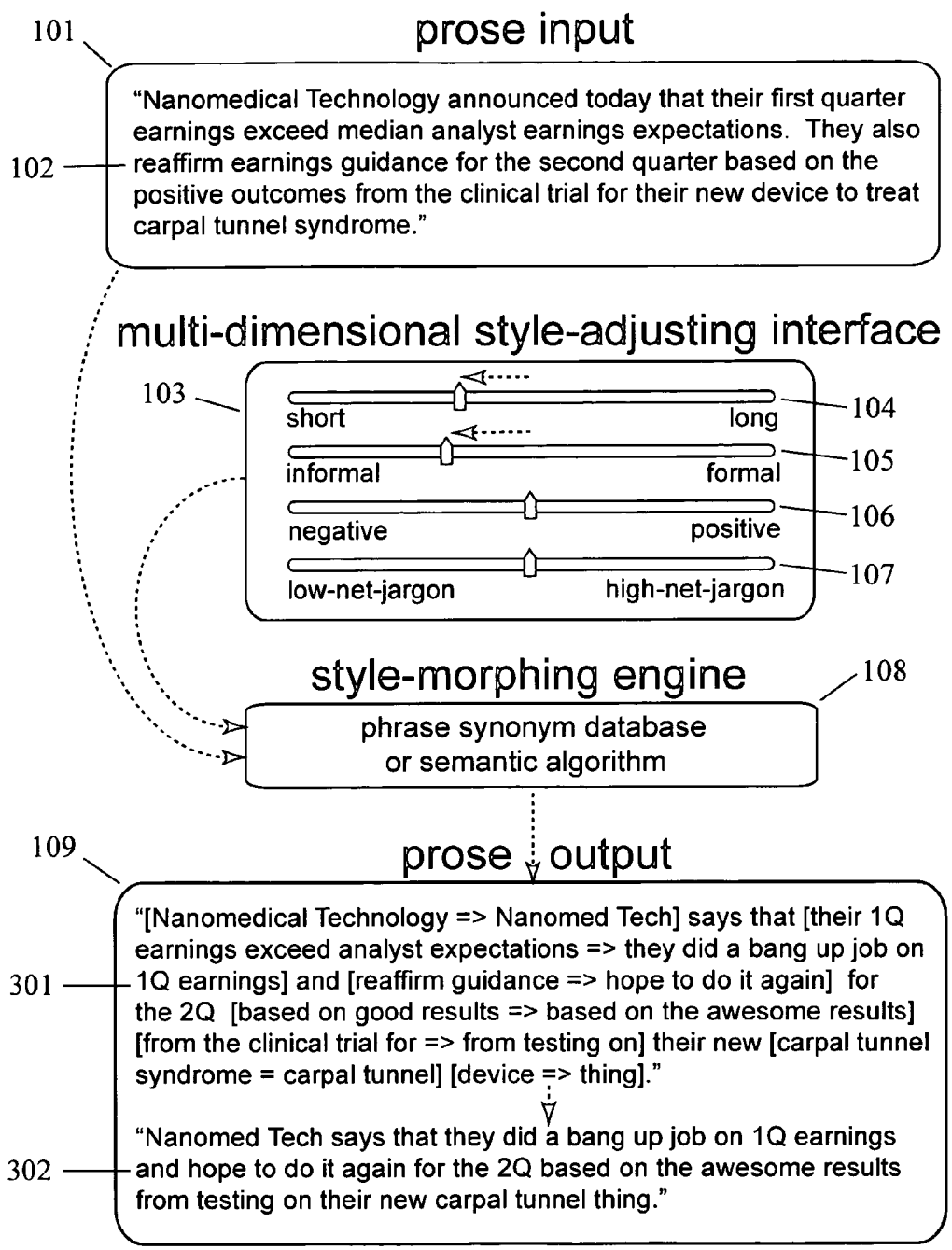

FIG. 3 shows the next step in this sequence of style variations. FIG. 3 builds on the changes made in FIG. 2. In FIG. 3, the user has incrementally adjusted two dimensions of prose style: length (as in FIG. 2) and formality (new in FIG. 3). As can be seen in FIG. 3, the user has incrementally adjusted the length of the prose by moving the pointer on slider bar 104 and incrementally adjusted the formality of the prose by moving the pointer on slider bar 105. Not only may these two style dimensions be adjusted incrementally, but they may also be adjusted independently.

We can see the results of these two style adjustments in the prose output window 109. The first portion of prose 301 in this window shows the phrase substitutions made by the style-morphing engine in response to user preferences expressed through the multi-dimensional style-adjusting interface. In this example, the first portion of prose, 301, in the prose output window is as follows:

"[Nanomedical Technology=>Nanomed Tech] says that [their 1Q earnings exceed analyst expectations=>they did a bang up job on 1Q earnings] and [reaffirm guidance=>hope to do it again] for the 2Q [based on good results=>based on the awesome results] [from the clinical trial for=>from testing on] their new [carpal tunnel syndrome=carpal tunnel] [device=>thing]."

In this example, the first portion 301 shows the incremental substitutions due to the formality adjustment alone, relative to the prose output 202 in FIG. 2. This isolates and highlights the types of substitutions that are made to make the prose less formal. This perspective is useful for clearly communicating how the style-morphing engine works for the purposes of this invention disclosure. In another example, however, the first portion 301 could show cumulative substitutions due to both length and formality adjustments, relative to prose input 102. In another example, the user might not want to see first portion 301 at all and might turn off its display.

The second portion of prose 302 that shown in prose output window 109 is the final prose output that includes all incremental, multi-dimensional style adjustments requested by the user through the multi-dimensional style-adjusting interface. In this example, prose 302 is as follows:

"Nanomed Tech says that they did a bang up job on 1Q earnings and hope to do it again for the 2Q based on the awesome results from testing on their new carpal tunnel thing."

One can easily see that it is shorter and less formal than the original prose. In another example, the user could have moved the formality-dimension slider bar to the right and made the prose more formal rather than less formal. The ability to incrementally adjust the formality of a body of prose can be very useful for tailoring written material for different audiences and contexts.

Figure 4:
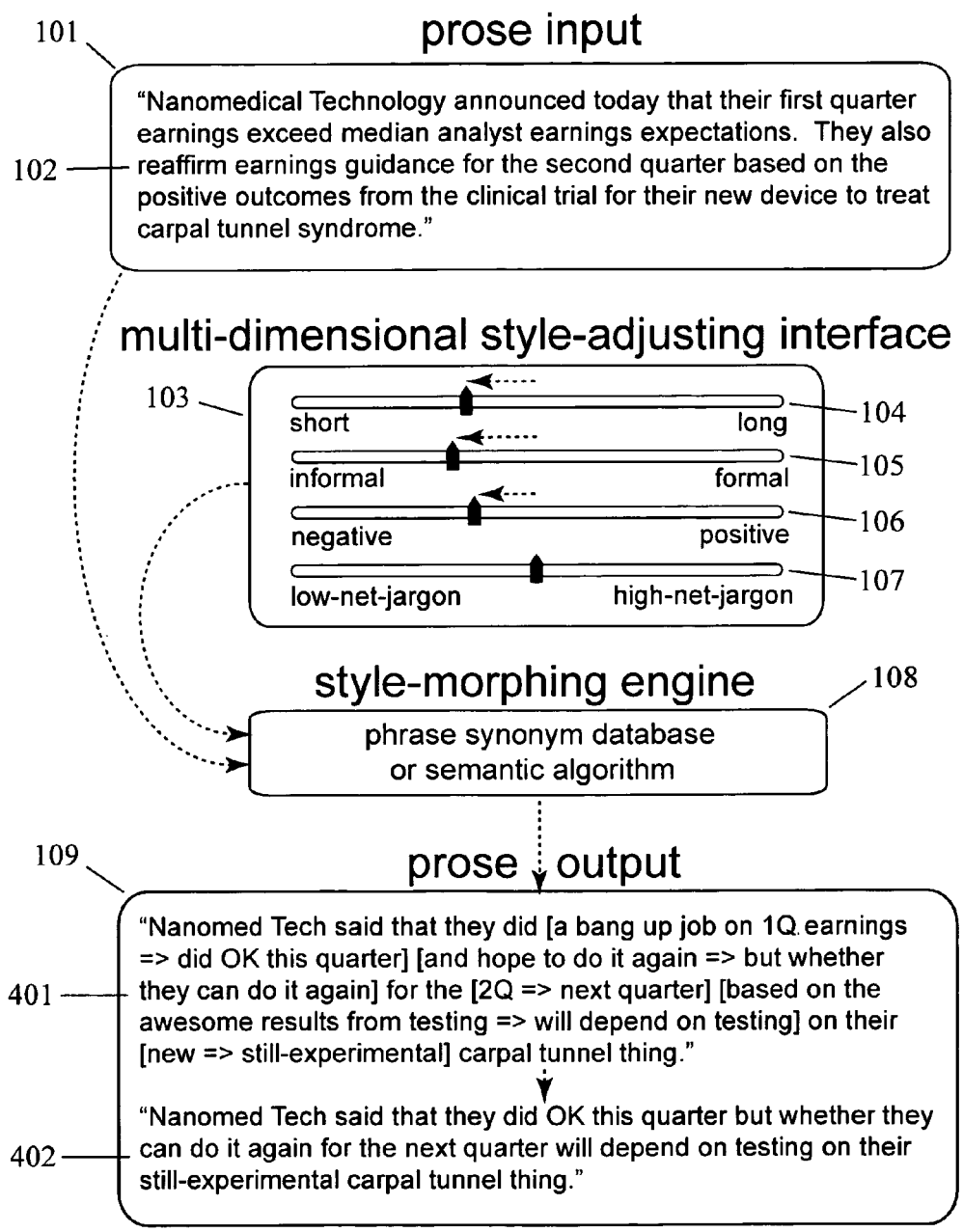

FIG. 4 shows another step in this sequence of style variations. FIG. 4 builds on the changes made thus far in FIGS. 2 and 3. In FIG. 4, the user has incrementally adjusted three dimensions of prose style: length (as in FIG. 2), formality (as in FIG. 3), plus positivity (new in FIG. 4). As can be seen in FIG. 4, the user has now incrementally adjusted the positivity of the prose by moving the pointer on slider bar 106 to the left. This will give the prose a more negative tone. We can see the cumulative results of adjustments to these three dimensions of prose style in the prose output window 109 in FIG. 4. The first portion of prose, 401, shows the phrase substitutions made by the style-morphing engine. In this example, the first portion of prose, 401, in the prose output window is as follows:

"Nanomed Tech said that they did [a bang up job on 1Q earnings=>did OK this quarter] [and hope to do it again=>but whether they can do it again] for the [2Q=>next quarter] [based on the awesome results from testing=>will depend on testing] on their [new=>still-experimental] carpal tunnel thing."

In this example, this first portion 401 (above) shows the incremental substitutions due to the positivity adjustment alone, relative to the prose output 302 in FIG. 3. This isolates and highlights the types of substitutions made to give the prose a more negative tone. In another example, the first portion 401 could show cumulative substitutions due to all style adjustments or not be displayed at all. The second portion of prose 402 shown in prose output window 109 is the final prose output that includes all incremental, multi-dimensional style adjustments requested by the user through the multi-dimensional style-adjusting interface. In this example, prose 402 is as follows:

"Nanomed Tech said that they did OK this quarter but whether they can do it again for the next quarter will depend on testing on their still-experimental carpal tunnel thing."

One can see that prose 402 it is now shorter, less formal, and more negative than original prose 102. In another example, the user could move the formality-dimension slider bar to the right and make the prose more positive rather than more negative. The ability to increase the positive tone of a body of prose could be very handy when writing a response to a proposal from one's boss!

Figure 5:
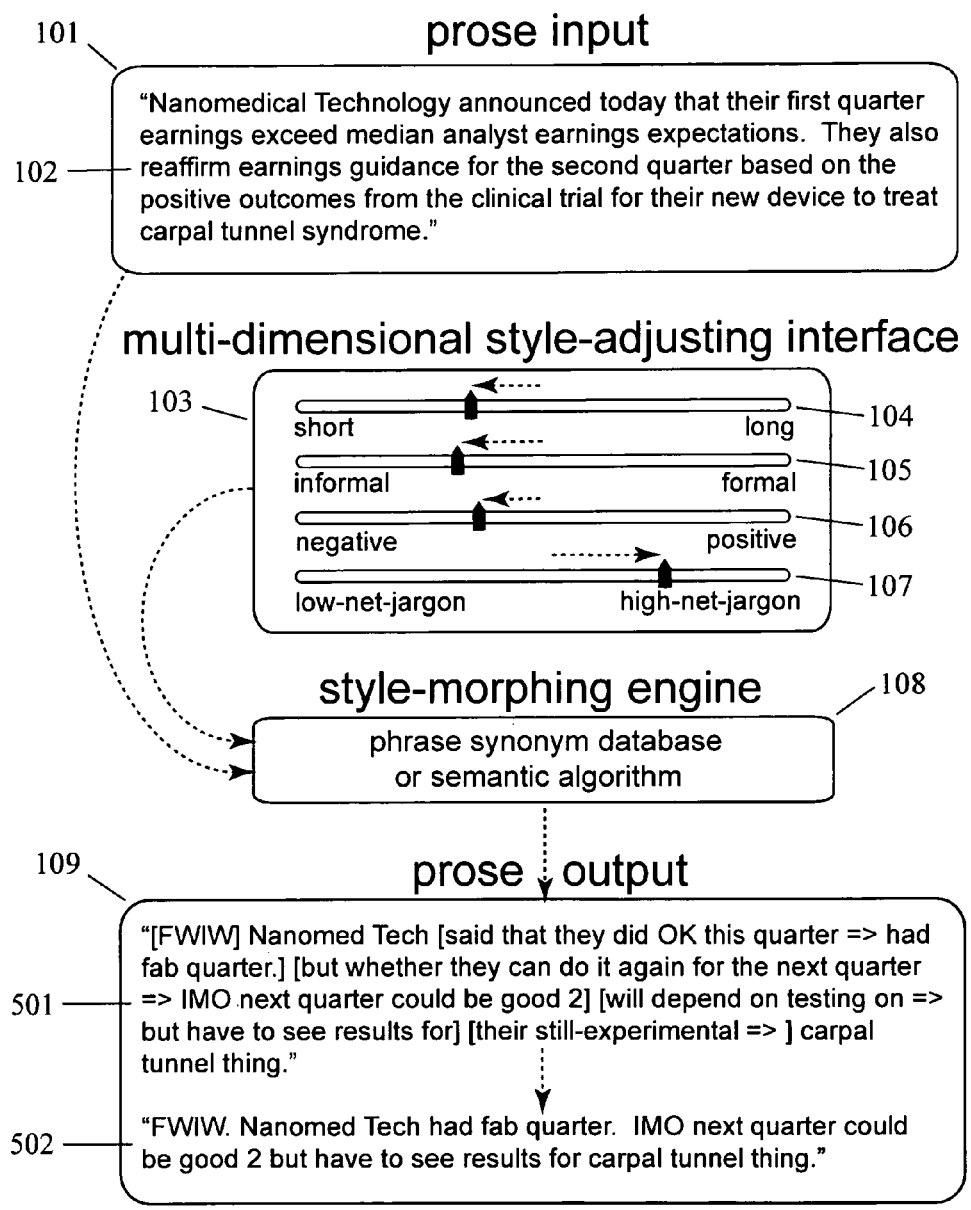

FIG. 5 shows another step in this sequence of style variations, building on the changes made thus far in FIGS. 2 through 4. In FIG. 5, the user has incrementally adjusted four dimensions of prose style: length (as in FIG. 2), formality (as in FIG. 3), positivity (as in FIG. 4), and net-jargon (new in FIG. 5). As can be seen in FIG. 5, the user has also incrementally adjusted the net jargon of the prose by moving the pointer on slider bar 107 to the right. This increases the use of net jargon, including expressions and abbreviations commonly used in electronic connectivity. We can see the cumulative results of adjustments to these four dimensions of prose style in the prose output window 109 in FIG. 5. The first portion of prose 501 shows the phrase substitutions made by the style-morphing engine. In this example, the first portion of prose 501 in the prose output window is as follows:

"[FWIW] Nanomed Tech [said that they did OK this quarter=>had fab quarter.] [but whether they can do it again for the next quarter=>IMO next quarter could be good 2] [will depend on testing on=>but have to see results for] [their still-experimental=>] carpal tunnel thing."

In this example, the first portion 501 shows the incremental substitutions due to the net jargon alone, relative to the prose output 402 in FIG. 4. This isolates and highlights the types of substitutions done to make the prose more like a message sent through electronic connectivity. In another example, the first portion 501 could show cumulative substitutions due to all style adjustments or not be displayed at all. The second portion of prose 502 shown in prose output window 109 is the final prose output that includes all incremental, multi-dimensional style adjustments requested by the user through the multi-dimensional style-adjusting interface. In this example, prose 502 is as follows:

"FWIW. Nanomed Tech had fab quarter. IMO next quarter could be good 2 but have to see results for carpal tunnel thing."

One can see that prose 502 it is now shorter, less formal, more negative, and more filled with internet jargon than original prose 102. In some respects, the dry, business-toned, upbeat original headline 102 has now been transformed into a short, informal, cautious line of text—one that could even be suitable for Twitter®. In another example, this incremental multi-dimensional style-adjusting tool could be used in the other direction to convert a short, informal, cautious "tweet" into a dry, business-toned, upbeat paragraph. The applications of such a powerful tool for incrementally and multi-dimensionally adjusting the style of a portion of prose are virtually endless.

I claim:

1. A method for incrementally and multi-dimensionally adjusting prose style comprising:

creating a database of sets of phrase synonyms within a data processing environment wherein a phrase is defined as a character string including one or more words, numbers, abbreviations or combinations thereof, and wherein set of phrase synonyms is defined as a set of phrases in which there is at least one phrase in the set for which all other phrases in the set can be substituted in prose usage without causing significant changes in the meaning of the prose or grammatical errors in the prose;

assigning rankings and/or values to phrases in the database for each phrase's ranking and/or value with respect to a dimension of prose style, for at least two different dimensions of prose style;

receiving input prose selected by a user via an interface between the user and a computer selected from a group consisting of: direct entry of prose by means of a physical or virtual keyboard, keypad, touchpad, or touch screen; importing prose from a file, document, or website; highlighting or identifying a portion of prose using a cursor; voice, speech, or gesture recognition; and selection of a file, document, or website in response to a search request;

receiving a style adjustment preference from a user for multiple dimensions of prose style through a multi-dimensional style-adjusting interface having multiple dimensions of prose style each assigned to an incrementally adjustable control between the user and the computer selected from one or more control elements in a group consisting of: virtual or physical slider bar; virtual or physical buttons, keyboard, keypad, or touch screen; virtual or physical dials or knobs; popup menu, drop down menu, or other virtual menu; data entry box, line, or space; mouse and/or cursor movement; voice or speech recognition; and gesture or posture recognition; and making adjustments to the style of the input prose within a data processing environment according to the style adjustment preference specified by the user through the multi-dimensional style-adjusting interface, wherein style adjustments are done (a) searching for phrases in the input prose that are in the database of phrase synonyms and (b) replacing the phrases in the input prose with intra-set phrase synonyms from the database with higher rankings and/or values in a dimension of style for which the user has indicated an increased preference through the multi-dimensional style-adjusting interface and/or replacing the phrases in the input prose with intra-set phrase synonyms from the database with lower rankings and/or values in a dimension of style for which the user has indicated a decreased preference through the multi-dimensional style-adjusting interface.

2. The method of claim 1 wherein at least one dimension of prose style is selected from the group consisting of: first, second, or third person perspective; past, present or future tense; and active or passive voice.

3. The method of claim 1 wherein at least one dimension of prose style is prose length.

4. The method of claim 1 wherein at least one dimension of prose style is selected from the group consisting of: vocabulary level; formality level; level of use of colloquial expressions; and level of grammatical simplicity or complexity.

5. The method of claim 1 wherein at least one dimension of prose style is selected from the group consisting of: level of emotionality; use of emoticons; use of romantic words; and level of positivity or negativity in tone.

6. The method of claim 1 wherein at least one dimension of prose style is selected from the group consisting of: weak or strong words; ambiguous or precise words; and words conveying uncertainty or certainty.

7. The method of claim 1 wherein at least one dimension of prose style is selected from the group consisting of: use of alliteration; and use of humor.

8. The method of claim 1 wherein at least one dimension of prose style is selected from the group consisting of: level of use of national-specific and/or regional-specific expressions; and geographic specification of national-specific and/or regional-specific expressions.

9. The method of claim 1 wherein at least one dimension of prose style is selected from the group consisting of: level of use of gender-specific terms; and gender specification of gender-specific terms.

10. The method of claim 1 wherein at least one dimension of prose style is a level of use of obscene words.

11. The method of claim 1 wherein at least one dimension of prose style is a level of use of specific academic jargon, business jargon, legal jargon, medical jargon, scientific jargon, and/or electronic-connectivity jargon.

12. The method of claim 1 wherein a multi-dimensional style-adjusting interface enables a user to adjust a percentage or proportion of total possible style-adjusting synonym substitutions which are actually substituted when adjustments are made to the style of the input prose.

13. The method of claim 1 wherein a multi-dimensional style-adjusting interface includes a virtual slider bar, dial, knob, or button that enables a user to adjust a proportion or quantity of style-adjusting synonym substitutions which are made when adjustments are made to the style of the input prose.

14. The method of claim 1 wherein a multi-dimensional style-adjusting interface includes a virtual menu that enables a user to adjust a proportion or quantity of style-adjusting synonym substitutions which are made when adjustments are made to the style of the input prose.

15. The method of claim 1 wherein a multi-dimensional style-adjusting interface includes voice recognition or gesture recognition that enables a user to adjust a proportion or quantity of style-adjusting synonym substitutions which are made when adjustments are made to the style of the input prose.

16. The method of claim 1 wherein a multi-dimensional style-adjusting interface includes a touch screen that enables a user to adjust a proportion or quantity of style-adjusting synonym substitutions which are made when adjustments are made to the style of the input prose.

* * * * *